United States Patent
Manotas Gutierrez et al.

(10) Patent No.: US 12,411,486 B2
(45) Date of Patent: Sep. 9, 2025

(54) ASSET HEALTH IDENTIFICATION FROM MULTI-MODALITY DATA ANALYSIS

(71) Applicant: International Business Machines Corporation, Armonk, NY (US)

(72) Inventors: Irene Lizeth Manotas Gutierrez, White Plains, NY (US); Xuan-Hong Dang, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 600 days.

(21) Appl. No.: 17/670,017

(22) Filed: Feb. 11, 2022

(65) Prior Publication Data

US 2023/0259117 A1  Aug. 17, 2023

(51) Int. Cl.
G05B 23/02 (2006.01)
G06N 20/00 (2019.01)
G06N 5/04 (2023.01)

(52) U.S. Cl.
CPC ......... G05B 23/0283 (2013.01); G06N 20/00 (2019.01); G06N 5/04 (2013.01)

(58) Field of Classification Search
CPC .. G05B 23/024; G05B 23/0283; G06N 20/00; G06N 5/04; G06N 5/022; G06N 7/01; G06N 3/02; G06F 16/9024; G06F 16/367; G06F 16/288; G06Q 40/06; G06Q 10/04; G06Q 10/20

See application file for complete search history.

(56) References Cited

U.S. PATENT DOCUMENTS

| | | | |
|---|---|---|---|
| 7,496,904 | B2 | 2/2009 | Srivastava et al. |
| 7,904,892 | B2 | 3/2011 | Babb, II et al. |
| 8,887,286 | B2 | 11/2014 | Dupont et al. |
| 10,438,001 | B1 | 10/2019 | Hariprasad |
| 10,911,470 | B2 | 2/2021 | Muddu et al. |
| 11,012,463 | B2 | 5/2021 | Vu et al. |
| 11,030,032 | B2 | 6/2021 | Ben Simhon et al. |
| 11,322,976 | B1* | 5/2022 | Anderson ............. G06N 3/044 |

(Continued)

OTHER PUBLICATIONS

Lou, J.-G., et al., "Mining Dependency in Distributed Systems Through Unstructured Logs Analysis", ACM Sigops Operating Systems Review 44, 2010, 6 pages, No. 1.

(Continued)

*Primary Examiner* — Eric J Yoon
(74) *Attorney, Agent, or Firm* — Scully, Scott, Murphy & Presser, P.C.; Caleb Wilkes

(57) ABSTRACT

A first set of data associated with assets can be received. An ontology graph can be constructed based on the first set of data. A second set of data associated with the assets can be received, the second set of data having a first frequency of sampling. Based on the second set of data, nodes of the ontology graph representing the assets can be characterized. A third set of data associated with the assets can be received, the third set of data having a second frequency of sampling. The third set of data can include real time data associated with the assets. Based on the third set of data and information associated with the assets represented by the ontology (Continued)

graph, a deep learning neural network can be trained to predict a future state of at least one asset of the assets and discover dynamic mutual impact of the assets.

18 Claims, 9 Drawing Sheets

(56) References Cited

U.S. PATENT DOCUMENTS

| | | | |
|---|---|---|---|
| 11,568,304 B1* | 1/2023 | Atta | G06Q 10/20 |
| 11,681,914 B2 | 6/2023 | Dang et al. | |
| 2016/0148103 A1* | 5/2016 | Sarrafzadeh | G06N 20/00 |
| | | | 706/46 |
| 2018/0005127 A1 | 1/2018 | Akyamac et al. | |
| 2019/0005423 A1 | 1/2019 | Pritzkau et al. | |
| 2020/0034734 A1* | 1/2020 | Agrawal | G05B 23/0283 |
| 2020/0387135 A1* | 12/2020 | Khorasgani | G05B 19/406 |
| 2021/0157671 A1* | 5/2021 | Shastri | H04L 41/12 |
| 2022/0085583 A1* | 3/2022 | Gundel | H02G 1/1248 |
| 2023/0080545 A1* | 3/2023 | Cella | B25J 11/00 |
| | | | 700/118 |
| 2023/0214690 A1* | 7/2023 | Elser | G06F 30/20 |
| | | | 706/11 |

OTHER PUBLICATIONS

Dong., C., et al., "Mining Data Correlation from Multi-Faceted Sensor Data in the Internet of Things", China Communications 8, 2011, 7 pages, No. 1.

Foroni, C., et al., "Using low frequency information for predicting high frequency variables", International Journal of Forecasting 34, 2018, pp. 774-787, No. 4.

Luo, L., et al., "A neural network-based joint learning approach for biomedical entity and relation extraction from biomedical literature", Journal of Biomedical Informatics (2020), Received Aug. 9, 2019, Received in revised form Nov. 19, 2019, Accepted Feb. 3, 2020 Available online Feb. 4, 2020, 8 pages, vol. 103.

Campos, J., "An Ontology for Asset Management", IFAC Proceedings vols. 2007, pp. 36-41, vol. 40, Issue 19.

Li, F., et al., "A neural joint model for entity and relation extraction from biomedical text", BMC Bioinformatics 2017, 11 pages, 18:198.

NIST, "NIST Cloud Computing Program", http://csrc.nist.gov/groups/SNS/cloud-computing/index.html, Created Dec. 1, 2016, Updated Oct. 6, 2017, 9 pages.

Github, Jhy1993, "Representation-Learning-on-Heterogeneous-Graph", Apr. 25, 2025, 06 pages, https://github.com/Jhy1993/Representation-Learning-on-Heterogeneous-Graph.

* cited by examiner

ASSET HEALTH IDENTIFICATION FROM MULTI-MODALITY DATA ANALYSIS

BACKGROUND

The present application relates generally to computers and computer applications, and more particularly to machine learning and equipment health or failure detection.

While many equipment and asset components can be monitored and managed individually, predicting their health and prioritizing maintenance of the equipment and asset components can be error-prone, for example, due to lack of accurate and timely information. Further, because dependencies can exist among assets or asset components, monitoring individual assets or asset components can lead to inaccuracies. Information, which can aid in assessing the health of the assets or asset components can also originate from different data sources having different formats and different timings, adding more complexity to analytics.

BRIEF SUMMARY

The summary of the disclosure is given to aid understanding of a computer system and method of asset health discovery, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A system, in an aspect, can include a processor and a memory device coupled with the processor. The processor can be configured to receive a first set of data associated with assets. The processor can be configured to construct an ontology graph based on the first set of data. The ontology graph can include nodes and edges connecting at least some of the nodes, where a node of the ontology graph can represent an asset of the assets, and where an edge connecting two nodes can represent a relationship between the two nodes. The processor can also be configured to receive a second set of data associated with the assets, where the second set of data has a first frequency of sampling. The processor can also be configured to, based on the second set of data, characterize the nodes of the ontology graph representing the assets. The processor can also be configured to receive a third set of data associated with the assets. The third set of data can have a second frequency of sampling. The third set of data can include real time data sampled by sensors associated with the assets. The processor can also be configured to, based on the third set of data and information associated with the assets represented by the ontology graph, train a deep learning neural network to predict a future state of at least one asset of the assets and discover dynamic mutual impact of the assets.

A system, in another aspect, can include a processor and a memory device coupled with the processor. The processor can be configured to receive a first set of data associated with assets. The processor can be configured to construct an ontology graph based on the first set of data. The ontology graph can include nodes and edges connecting at least some of the nodes, where a node of the ontology graph can represent an asset of the assets, and where an edge connecting two nodes can represent a relationship between the two nodes. The processor can also be configured to receive a second set of data associated with the assets, where the second set of data has a first frequency of sampling. The processor can also be configured to, based on the second set of data, characterize the nodes of the ontology graph representing the assets. The processor can also be configured to receive a third set of data associated with the assets. The third set of data can have a second frequency of sampling. The third set of data can include real time data sampled by sensors associated with the assets. The processor can also be configured to, based on the third set of data and information associated with the assets represented by the ontology graph, train a deep learning neural network to predict a future state of at least one asset of the assets and discover dynamic mutual impact of the assets. The information associated with the assets represented by the ontology graph can be used to regularize a learning process of the deep learning neural network.

A system, in another aspect, can include a processor and a memory device coupled with the processor. The processor can be configured to receive a first set of data associated with assets. The processor can be configured to construct an ontology graph based on the first set of data. The ontology graph can include nodes and edges connecting at least some of the nodes, where a node of the ontology graph can represent an asset of the assets, and where an edge connecting two nodes can represent a relationship between the two nodes. The processor can also be configured to receive a second set of data associated with the assets, where the second set of data has a first frequency of sampling. The processor can also be configured to, based on the second set of data, characterize the nodes of the ontology graph representing the assets. The processor can also be configured to receive a third set of data associated with the assets. The third set of data can have a second frequency of sampling. The third set of data can include real time data sampled by sensors associated with the assets. The processor can also be configured to, based on the third set of data and information associated with the assets represented by the ontology graph, train a deep learning neural network to predict a future state of at least one asset of the assets and discover dynamic mutual impact of the assets. The deep learning neural network can generate a dynamic dependency graph that represents the dynamic mutual impact of the assets.

A system, in another aspect, can include a processor and a memory device coupled with the processor. The processor can be configured to receive a first set of data associated with assets. The processor can be configured to construct an ontology graph based on the first set of data. The ontology graph can include nodes and edges connecting at least some of the nodes, where a node of the ontology graph can represent an asset of the assets, and where an edge connecting two nodes can represent a relationship between the two nodes. The processor can also be configured to receive a second set of data associated with the assets, where the second set of data has a first frequency of sampling. The processor can also be configured to, based on the second set of data, characterize the nodes of the ontology graph representing the assets. The processor can also be configured to receive a third set of data associated with the assets. The third set of data can have a second frequency of sampling. The third set of data can include real time data sampled by sensors associated with the assets. The processor can also be configured to, based on the third set of data and information associated with the assets represented by the ontology graph, train a deep learning neural network to predict a future state of at least one asset of the assets and discover dynamic mutual impact of the assets. The future state can be used to prioritize maintenance of the assets.

A system, in another aspect, can include a processor and a memory device coupled with the processor. The processor can be configured to receive a first set of data associated with assets. The processor can be configured to construct an ontology graph based on the first set of data. The ontology graph can include nodes and edges connecting at least some of the nodes, where a node of the ontology graph can represent an asset of the assets, and where an edge connecting two nodes can represent a relationship between the two nodes. The processor can also be configured to receive a second set of data associated with the assets, where the second set of data has a first frequency of sampling. The processor can also be configured to, based on the second set of data, characterize the nodes of the ontology graph representing the assets. The processor can also be configured to receive a third set of data associated with the assets. The third set of data can have a second frequency of sampling. The third set of data can include real time data sampled by sensors associated with the assets. The processor can also be configured to, based on the third set of data and information associated with the assets represented by the ontology graph, train a deep learning neural network to predict a future state of at least one asset of the assets and discover dynamic mutual impact of the assets. The assets can include machinery equipment.

A computer-implemented method, in an aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The information associated with the assets represented by the ontology graph can be represented as a data structure including an adjacency matrix.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The deep learning neural network can include self-attention encoder-decoder.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The deep learning neural network can take as input multiple time series data generated from the assets.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The information associated with the assets represented by the ontology graph can be used to regularize a learning process of the deep learning neural network.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The deep learning neural network can generate a dynamic dependency graph that represents the dynamic mutual impact of the assets.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The future state can be used to prioritize maintenance of the assets.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The deep learning neural network can be retrained based on receiving updates to the second set of data.

A computer-implemented method, in another aspect, can include receiving a first set of data associated with assets. The method can also include constructing ontology graph based on the first set of data. The ontology graph can include nodes and edges connecting at least some of the nodes, where a node of the ontology graph can represent an asset of the assets, and where an edge connecting two nodes of the ontology graph can represent a relationship between the two nodes. The method can also include receiving a second set of data associated with the assets. The second set of data can have a first frequency of sampling. The method can also include, based on the second set of data, characterizing the nodes of the ontology graph representing the assets. The method can also include receiving a third set of data associated with the assets. The third set of data can have a second frequency of sampling. The third set of data can include real time data sampled by sensors associated with the assets. The method can also include, based on the third set of data and information associated with the assets represented by the ontology graph, training a deep learning neural network to predict a future state of at least one asset of the assets and discover dynamic mutual impact of the assets. The assets can include machinery equipment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
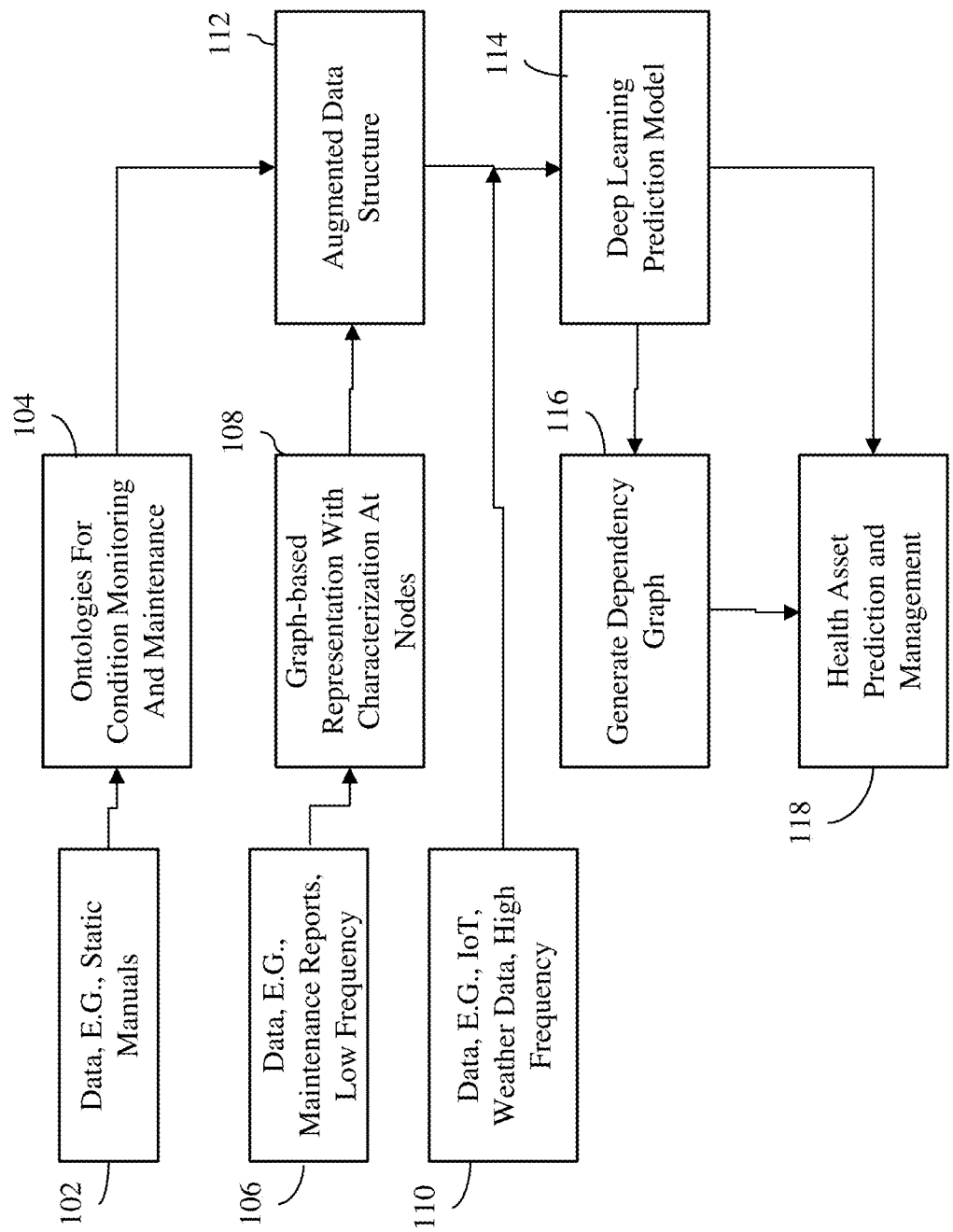
FIG. 1 is a diagram illustrating a method in an embodiment.

Informative patterns toward accurate asset prediction and management may be gleaned from different data sources using various formats such as usual manuals, asset specification documents, regular and/or low-frequent maintenance reports, and/or high-frequent numerical data generated from Internet of things (IoT) sensors monitoring asset's components and/or entire system. Dependencies can exist or manifest among components working together or in the same area.

Systems, methods and techniques are disclosed, which can analyze different assets' data sources and predict assets' health, prioritize maintenance of assets, and identify dependencies among components even in the presence of different and many types of data sources with complex relationships between assets. Explainable dependencies among assets can provide understanding of causes and/or effects.

Life-time performance of an asset component can depend on many factors, for example, including the asset component/equipment themselves as well as their interaction under operation. Maintaining asset's components individually may lead to incomplete and inaccurate asset health evaluation and/or prediction. Also, given the large volume of equipment and asset component, manually evaluating their health can be subject to potential misses in both completeness and accuracy. Asset health assessment may require multi-faceted information for accurate health prediction, where information can originate from different sources, under different formats, where data may continuously change or change from time to time while the assets are under operation.

In one or more embodiments, the systems, methods and/or technique may provide capability for timely forecast, alert, and may explain issues behind operating components, while providing possible causes behind each prediction. In an embodiment, the systems, methods, and/or technique may automatically analyze assets' data sources and based on the analysis may optimally predict the assets' health, prioritize their maintenance process, and timely generate graphs of dependencies among assets' equipment, for example, as means for explanation.

In an embodiment, the system and/or method can include an artificial intelligence (AI)-guided model. The system and/or method may extract information pertaining to static, low-frequent, and high-frequent data associated with each asset's component and across all assets. The system and/or method may construct graphs, or ontologies, for condition monitoring and maintenance of assets and their components. An AI-based deep learning model can be developed or implemented, which can receive multiple input real-time generated data from multiple assets' components, discover their dynamic mutual impact with augmented information represented in graphs and/or ontologies, predict future asset health status based on discovered patterns, and/or generate dependencies of asset components as means of explanation for the asset health prediction and for prioritizing their repairs and replacements.

FIG. 1 is a diagram illustrating a method in an embodiment. The method can be implemented or performed on one or more computer processors, e.g., including hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 102, first data (e.g., also referred to as a first set of data) can be collected, obtained, or received. The first data can be one-time data or static data from sources like textual documents, such as technical manuals and components' installation location. The first data can be data that convey relatively static information about assets. It is contemplated that the first data can change, for example, if such information about assets changes, e.g., updates to manuals to documentations.

At 104, based on the first data, for example, one or more graphs or ontologies (e.g., also referred to as ontology graph or ontology graphs) can be formed or built or constructed, for example, for condition monitoring and/or maintenance among related assets or asset's components. For instance, initially, an ontology graph can be static, for example, built based on relatively static information such as technical or installation manuals or documentations. If new manuals or documentations (or updates to static information) are received, the ontology graph can be updated. An ontology graph can include nodes and edges connecting at least some of the nodes, where a node of the ontology graph represents an asset of the assets, and wherein an edge connecting two nodes represents a relationship between the two nodes. An asset can be an equipment such as a machinery equipment or component. Examples of assets in computer networks can include, but not limited to, processors, storage devices, network devices, and/or others.

At 106, second data can be collected, obtained, or received. The second data can be data that can be obtained at certain frequency, for example, also referred to as a first frequency of sampling. For example, the second data can be data with low-frequent changes, such as periodic (for example, monthly, quarterly, or another interval) data of asset's maintenance.

At 108, based on the second data (e.g., also referred to as a second set of data), a characterization associated to each asset or asset's component can be formed or created. For instance, the characterization can be graph-based or represented using a graph data structure or format. The characterization can encode different asset features, e.g., modes or types of interaction and functionality among assets. For example, an air condition system can operate at different modes like cooling, heating, or (de)humidifying. Within each mode, interaction among involved asset components can be different. Likewise, interactions among multiple asset components of a vehicle engine can be different depending on a particular operating mode of that engine, such as manual, eco, or another mode; These interactions can also vary under different weather types or environment conditions like muddy, snowy, or desert. Frequencies of maintenance and replacement can influence the performance of each individual component under different operation modes and functionalities. For instance, a new replacement of fuel pump can hardly cause abnormal health of the jet engine operating under mild climate, but in other extreme conditions like too hot or too cold, it still can be a potential cause. The characterization can be added on to the one or more static graphs or ontologies (e.g., an ontology graph created using relatively static data) created at 104. For example, based on the second set of data, the nodes of the ontology graph representing the assets can be characterized. For instance, the second data can be used to add additional or new information about the assets represented in the ontology graph.

At 110, third data (also referred to as a third set of data) can be collected, obtained, or received. The third data can be data such as real-time data, for example, which can be detected by, and/or received from, IoT sensors and devices monitoring over asset components (for example, which may also include weather data). The third data can be used to infer the real interaction, influence among asset equipment. In an embodiment, the third data can have frequency of occurrence or sampling (also referred to as a second frequency of sampling) that is higher than the first frequency of sampling (e.g., of the second data). For example, the third data can include real time data sampled by sensors associated with the assets.

At 112, an augmented data structure can be created from the sources described at 102, 104, 106, 108 (e.g., the first data and the second data). For example, data structure associated with the ontology graph shown at 104 can be augmented with the characterizations of the components (e.g., nodes of the ontology graph) shown at 108. For example, the information associated with the assets represented by the ontology graph can be represented as a data structure. By way of example, such data structure can include one or more adjacency weighted matrices. The different types of data sources (e.g., 102, 106 and 108) can be combined to create training data to feed into a deep learning model or deep learning neural network model for training the model, a prediction model. For instance, the augmented data structure at 112 and the third data (e.g., real time data) can be used as training data.

At 114, using such training data, a deep learning model can be trained to predict next states of asset components (e.g., future health of the asset components), and to generate dependency graphs. At 116, dependency graphs can be constructed or generated. The dependency graphs can explain the prediction in an embodiment. For example, a deep learning neural network can be trained to predict a future state of at least one asset of the assets and discover dynamic mutual impact of the assets. In an embodiment, the information associated with the assets represented by the ontology graph can be used to regularize a learning process of the deep learning neural network.

At 118, together with augmented and latest collected data, the trained deep learning model can be deployed to predict assets' health, and to create dependency graphs, which can be used to discover the dynamic mutual impact of the assets. In an embodiment, the deep learning model may both predict the assets' health and create dependency graphs at the same run or simultaneously. In an embodiment, the deep learning neural network can include a self-attention encoder-decoder.

In an embodiment, the deep learning neural network can take as input multiple time series data generated from the assets.

For example, based on the third data (e.g., real time sensor data) and information associated with the assets represented by the ontology graph (e.g., augmented data structure), a deep learning neural network can be trained to predict a future state of at least one asset of the assets and discover dynamic mutual impact of the assets. A dependency graph that is generated can be considered dynamic as the dependencies can change from time to time, or from run to run of the deep learning neural network. The dependency graph can represent or explain the mutual impact of the assets at a given time or state. For instance, the deep learning neural network can generate a dynamic dependency graph that represents dynamic mutual impact of the assets.

Discovered inter-dependencies among asset components from the deep learning model and the augmented data structure can be used to generate timely reports about assets components conditions. The model and the dependency graph can be used to prioritize assets requiring maintenance (repairs, replacements) and/or improve management process. For example, maintenance and/or repair of the assets can be prioritized, scheduled, alerted, and/or actuated, based on the prediction and/or the discovered impact. By way of example, an alert can be in a form of automatically triggering a chatbot or like automated device to notify a user or engage in a conversation with a user. Actuating can include, but not limited to, automatically triggering a robot or like automated machine or programmable or controllable machine to initiate maintenance or repair.

The deep learning model can be updated based on low-frequency data collection. For example, new components can have been added, new maintenance reports may have been generated. Based on the updates to the assets or asset components, and corresponding updates in the data associated with the assets or asset components, the deep learning model can be retrained, or kept updated.

Figure 2:
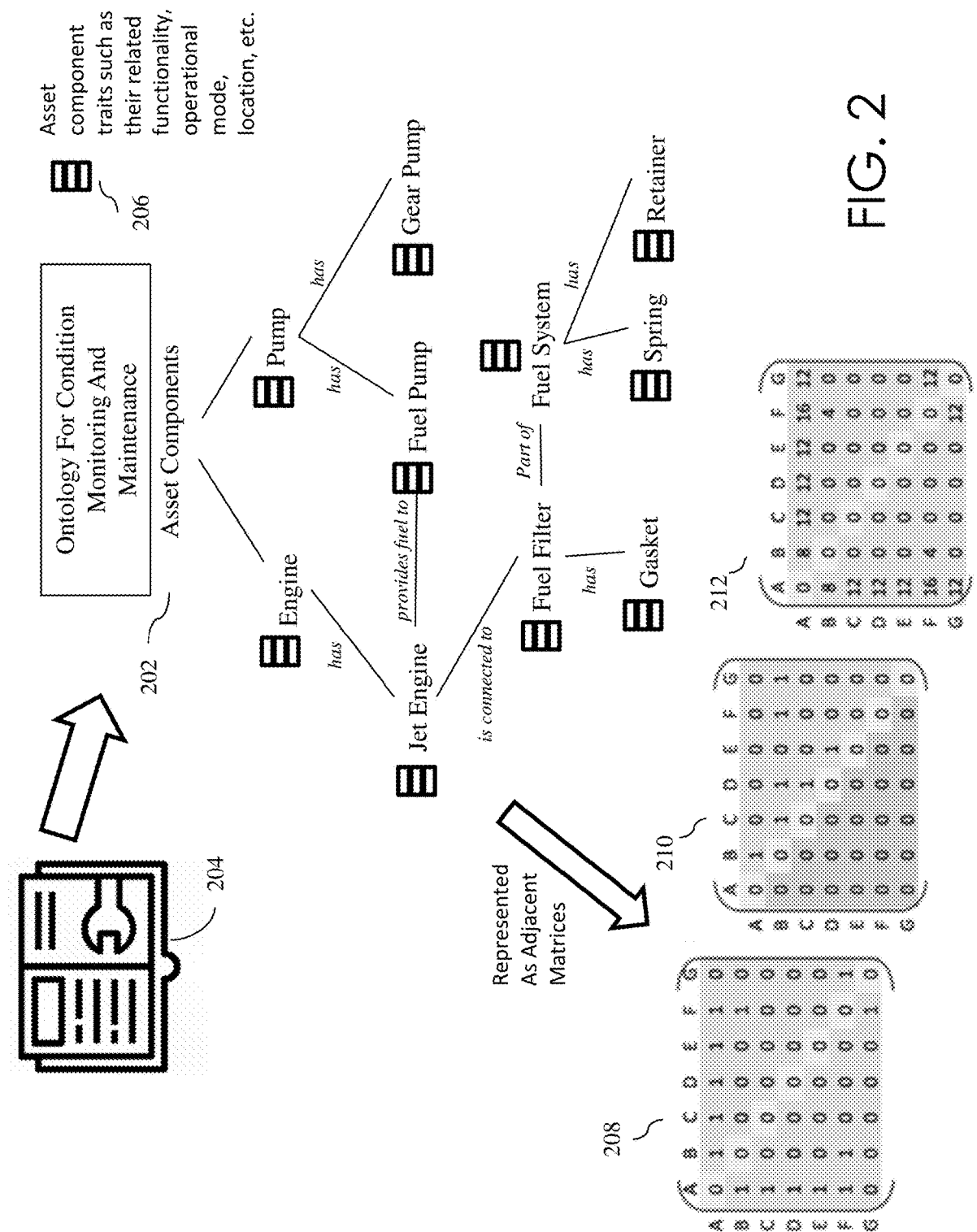
FIG. 2 illustrates an example ontology or graph that can be created for asset condition monitoring and maintenance in an embodiment.

FIG. 2 illustrates an example ontology or graph that can be created for asset condition monitoring and maintenance in an embodiment. Such an ontology can facilitate communication and knowledge sharing in various applications such as decision support systems. In an embodiment, a system and/or method can use and/or adapt techniques in natural language processing to extract assets' components (entities) and to discover their association from text such as technical manuals, specification documents, and/or others. Information from such sources 204 can be used to form a graph or ontology 202 among asset's components. In an embodiment, expert domain can be employed to improve ontologies. In an embodiment, characteristics or data associated with each asset or asset's component can be built and updated with additional information from sources such as maintenance reports. Characteristics can include physical dependency (e.g., installation location), technical dependencies, sequence of maintenances and/or feature values associated at nodes of the graph or ontology. For example, each asset or component can have its own traits, attributes, properties, or characteristics (e.g., functionality, location, operational modes, and/or other features) 206, and based on such characteristics, relationships among the assets or asset components can be identified or built. In an embodiment, dependency graphs can be created using co-occurrence analysis (frequent pattern extraction) and Bayesian inference. For example, the relationships or dependencies can be represented using adjacency matrices 208, 210, 212. By way of example, an adjacency matrix 208 representative of functional and/or operational relationships between assets or asset components can be built. For example, the value of 1 can represent that the components represented by row and column entry are functionally related, and the value of 0 can represent that the components represented by row and column entry are not functionally related.

Functionality adjacency matrix can be built from the ontology graphs, which can be directed graphs, and which can show that component A can impact component B, C, D, E, F, component B can impact component A and F, component C can impact component A, and so forth. As another example, another adjacency matrix 210 representative of locations can be built, for example, which can represent by the value of 1 that the components represented by row and column entry are located next to each other (or could also represent that they are in the same location), and represent by the value of 0 that the components represented by row and column entry are not located next to each other (or could also represent that they are not in the same location). Yet as another example, an adjacency matrix 212 can represent impact significance of a component on another component. Different characteristics can be represented by an adjacency matrix. Different values can be used to represent relationships. For example, depending on a specific application, other adjacency matrices can be generated. The values of the adjacency can be normalized and vary based on the application and the manner of training the model.

Figure 3:
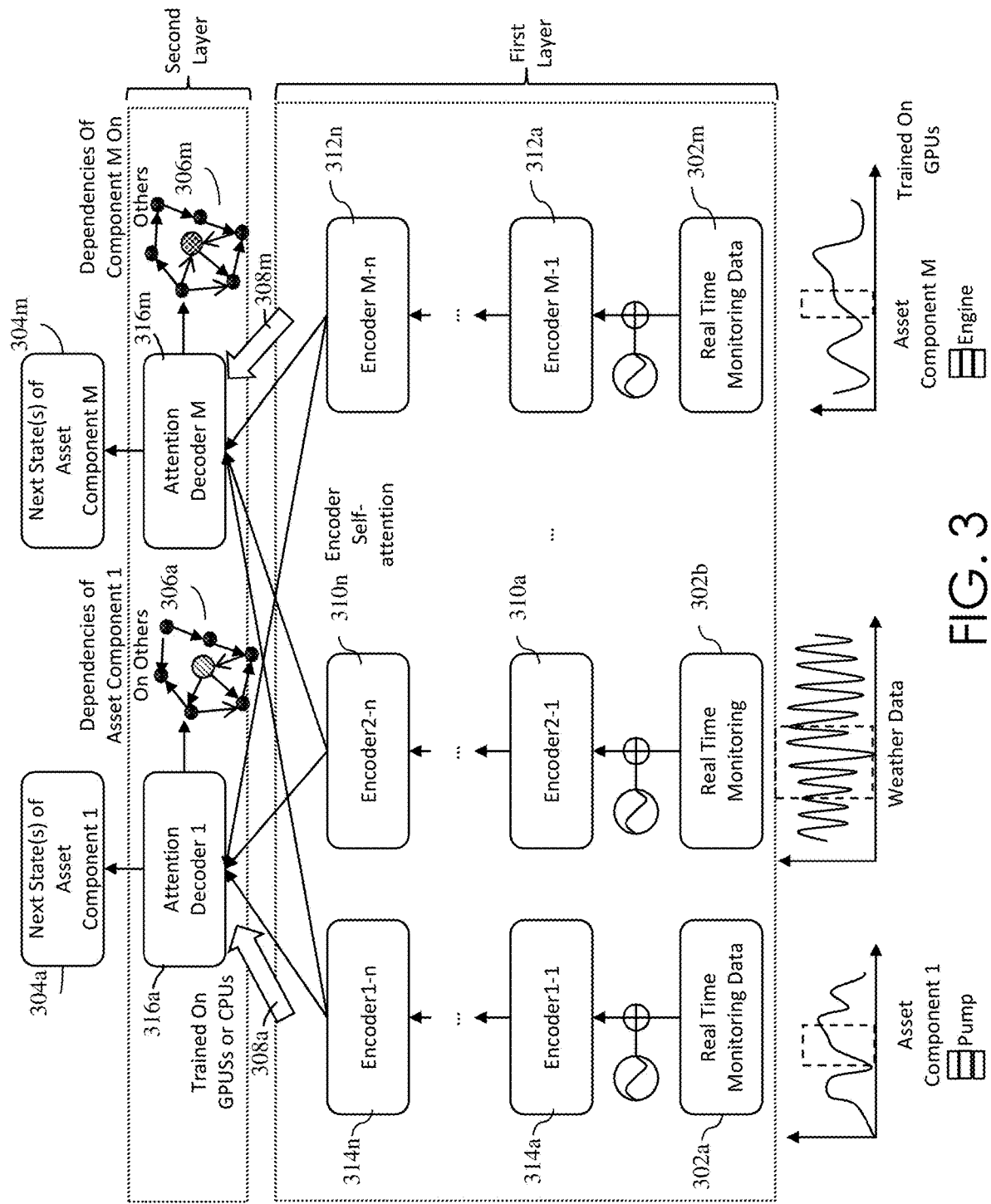
FIG. 3 and FIG. 4 show a diagram illustrating a deep learning model in an embodiment.

FIG. 3 is diagram illustrating a deep learning model in an embodiment. The deep learning model, in an embodiment, can be a self-attention neural network model, which can be implemented on and/or run on one or more computer processors, for example, including one or more hardware processors. In an embodiment, a deep learning neural networks receives multiple input channels or input 302a, 302b, . . . , 302m, each for real-time monitoring data from each asset component. The real-time monitoring data can be time series data associated with a component (e.g., x-axis can represent time and y-axis can represent the sensor or monitored data value. In an embodiment, the deep learning neural networks or the model is trained to perform predicting of next state or states in each asset component 304a, . . . , 304m, and discovering of dependencies of each component on the others 306a, . . . , 306m, in a timely manner.

For example, input at 302a can include sensor data obtained from monitoring asset component 1, e.g., a pump; input at 302b can include weather data associated with the location of the asset or asset component; input at 302m can include sensor data obtained from monitoring asset component m, e.g., an engine. In an embodiment, the timing or frequency of the monitored data can be different for different input channels. For instance, the sensor data associated with asset component 1 at 302a may be data collected at every 5 minutes in real time by a sensor; the sensor data associated with asset component 2 at 302m may be data collected at every 10 minutes in real time by another sensor. In an embodiment, a sliding window of time series can be considered for training. The size of the sliding window can be configured, predetermined, or fine-tuned from the observed training data.

Each input data at 302a, 302b, . . . , 302m, can feed through a plurality of encoders, which encode the input data into a latent space. For instance, real time monitoring data at input channel at 302a, can be fed to encoders 314a, . . . , 314n; real time monitoring data at input channel at 302b, can be fed to encoders 310a, . . . , 310n; and real time monitoring data at input channel at 302m, can be fed to encoders 312a, . . . , 312n. The encoders encode the input data into a latent space. For example, the encoders encode the time series data into a vector.

Figure 4:
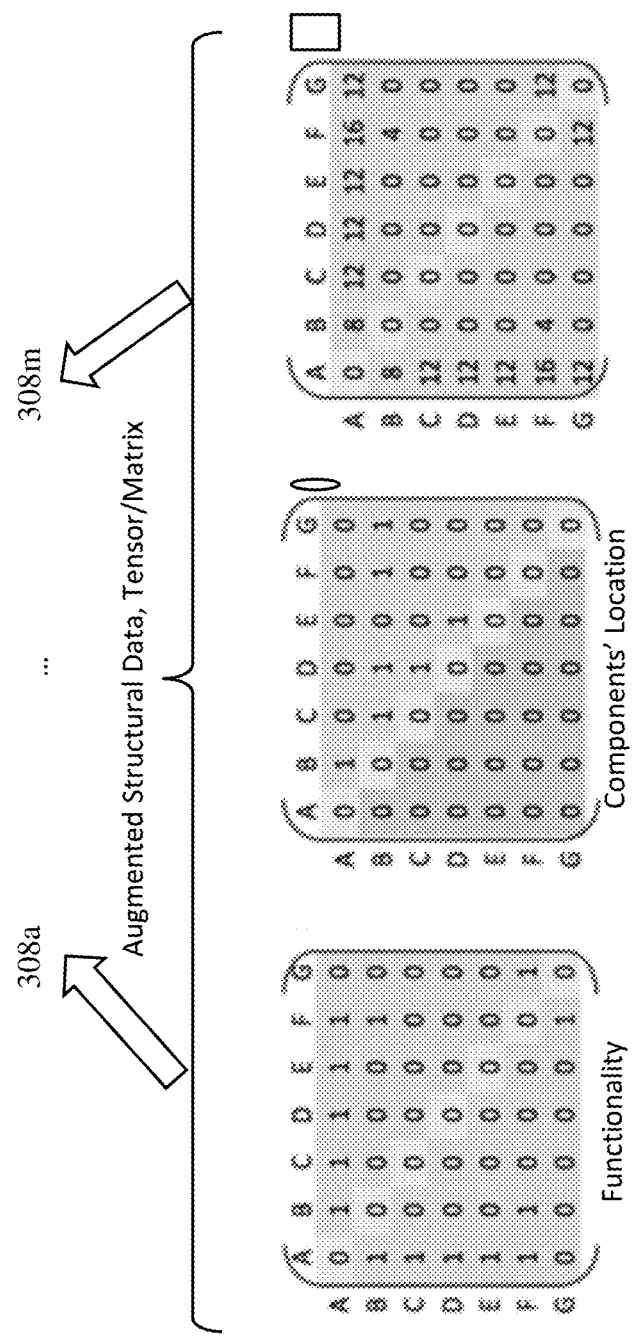

In an embodiment, the created graph ontologies and augmented structural data, for example, provided from sources other than real-time data, and for example, represented as adjacency matrices (FIG. 4), can act as prior expert knowledge. Such adjacency matrix data can also be input to the deep learning model 308a, . . . 308m, and acts to regularize the learning process toward asset components' dependencies 306a, . . . , 306m, for example, narrowing down searching space and also stabilizing timing frequency with lower frequency data. For instance, low-frequency data can be modeled as augmented information under graph format, carrying richer information, to regularize the learning process of the deep learning neural networks. Attention decoders 316a, . . . , 316m can learn, based on the encoded input data and regularization adjacency matrix or matrices, to predict the next state or future health of the respective asset components, also learn the dependencies of an asset component on other asset components. Each of the attention decoders 316a, . . . , 316m, can take as input the encoded data of all asset components and the augmented data structure (adjacency matrices representing static and low-frequency data). An attention decoder can be built from one or more layers of recurrent neural networks (RNNs), temporal convolutional networks (TCN), or transformer networks. For example, if an RNN is used for 316a, the hidden states at time point t of the decoder 316a are aligned with the output vectors from all encoders. Such vectors alignment computation is regularized by the augmented information encoded in the matrix forms at 308a. Hence, the regularization form like Frobenius norm can be used. The discovered similarities are soft-max normalized to form the attention weights over the output vectors from all encoders. They are subsequently used to construct a context vector from which the next health state of the corresponding asset component 1 is predicted at time point t+1, at the output of 304a. At the same time, such attention weights are interpreted as dependencies of asset component 1 on other asset components, outputted as graph in 306a. Attention decoders (e.g., . . . , 316m) work similarly.

Predicted next condition/status of asset's components 304a, . . . , 304m, can be provided. Dependences can be identified based on generating dependency graphs 306a, . . . , 306m, for instance, a dependency graph per asset component. For example, at 306a, a node shown in the center can represent asset component 1, and the other nodes can represent other asset components, where a directed graph can represent dependencies among components. In an embodiment, the model does not need manual labelling but can exploit large scale of un-labeled data. In an embodiment, the predicted status of asset's components 304a, . . . , 304m can help to identify asset' health such as possibility of failure along with insightful explanation provided in real-time generated asset's components dependencies 306a, . . . , 306m. The predicted status of assets or asset components 304a, . . . , 304m can also help to prioritize asset equipment requiring maintenance, to improve the management process. In an embodiment, such maintenance or repair can be automatically actuated, for example, based on the automatic prioritization. In an embodiment, the model can be revised or retrained based on updates of low-frequent data such as newly added maintenance reports, replacement or addition with new equipment, and/or others. The model can also be updated or retrained based on updates or changes in the static data (e.g., first data) and/or historic real-time sensor data (e.g., third data).

Figure 5:
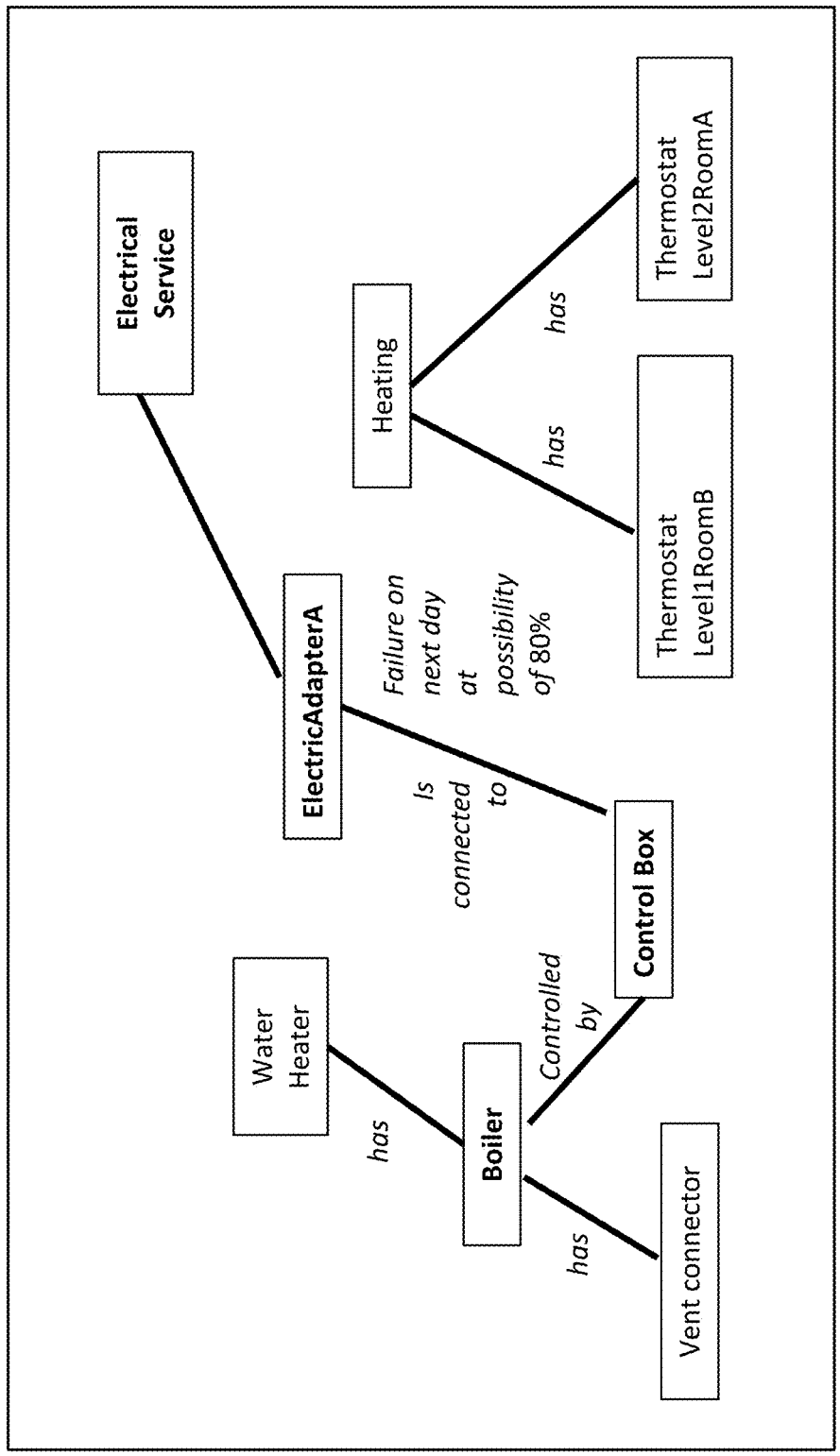
FIG. 5 is another example of an ontology graph that can be created according to an embodiment of a method disclosed herein.

In an embodiment, the model can be multi-modal and can assess health of equipment or equipment components. The model can identify dependencies between facility assets (e.g., equipment) and their components. The model can predict failures in assets and facilitate understanding of interactions between assets and their impact on each other. By way of example, there can be different operational assets located close to one another in an equipment facility, area, or room. FIG. 5 is another example of an ontology graph that can be created according to an embodiment of a method disclosed herein. For instance, such a facility may have a water heater, an electric adapter (e.g., which can be serviced), and a heating equipment. The components in the facility can be connected or linked by their relationships. For example, the water heater can have a boiler, which in turn has a vent connector and is controlled by a control box; the electric adapter can also be connected to the control box. The heating equipment can have thermostats associated with different areas. The system and/or method in one or more embodiments can perform real-time data monitoring over assets and their components and use graph-based data for augmentation toward learning a reliable prediction model and explanation. For example, the prediction model may be able to predict that in a next day or so (or another future time), a component may fail with possibility or confidence value of 80 percent (%). A user can be alerted as to the possibility of the failure. Further, repair or maintenance can be automatically scheduled or prioritized. In another embodiment, such scheduling or prioritization may automatically trigger or actuate the repair or maintenance at the scheduled time. In an embodiment, system and/or method process multiple data sources and utilize ontologies to regularize the learning process toward predictive patterns. The system and/or method may discover real-time dependencies among asset's components from high-frequency data (e.g., sensor data) with augmented data learnt from low-frequency data (e.g., maintenance or repair reports). The model can be applied in many domains such as manufacturing, computer network system, cloud systems, processors, memory and network throughput to predict the future states of such systems.

A system and/or method can automatically analyze assets' data sources to maximize the asset health prediction, prioritize assets' maintenance process, and timely generate graphs of dependencies among asset's equipment as means for explanation. An artificial intelligence (AI)-guided model and system can extract information pertaining to static, low-frequent, and high-frequent data associated with each asset's component and across all assets, construct graphs, or ontologies, for condition monitoring and maintenance of assets and their components. An AI-based deep learning model can be developed that: receives multiple input real-time generated data from multiple assets' components, discovers their dynamic mutual impact with augmented information represented in graph ontologies, predicts future asset health status based on discovered patterns and generates asset component dependencies as means of explanation for the asset health prediction and/or for prioritizing their repairs and replacements.

A system and model based on AI can "forecast" health status of various asset components involved in a monitoring system. Dependencies among asset components can be reflected via an ontology or a graph structure, and the model can exploit such information along with the timely generated data to forecast and alert health status of any specific asset component. In an aspect, dependencies among asset are not fixed but can dynamically change when the monitoring system is under operation, and the model is able to discover such timely changed dependencies. Dynamic dependencies can be used to provide root causes behind each prediction upon the asset health.

The system and model can monitor and predict heath status of asset components involved in a physical or network monitoring system. Data timely generated from asset components can be used to forecast their future behaviors, upon which the system can prioritize assets requiring maintenance such as repairs or replacements. Dependencies among asset components in the model can dynamically change along with time, depending on various condition in which they are operating, including the weather data (e.g., multi-data modalities).

The model can be a deep learning model that can timely analyze the data generated from various asset components to identify their health conditions in the near future. The health status of a particular asset component can be identified timely based on timely generated data, its interaction with other asset components in the monitored system, and the time series of weather data. Dependencies among asset components can be identified at different levels, depending on the frequency of collected data, including ontologies learnt from user manual/functionality (for instance), graph-based representation with characteristics at nodes learnt from low-frequency data such as maintenance reports. They can be used to regularize the model toward learning a predictive model for the asset components' health, prioritizing the asset components for maintenance and replacement. In an embodiment, the model is a deep learning model trained on annotated data for performing forecasting. An AI model based on deep learning can analyze data arriving from multiple asset components to forecast the asset components' health status in the future, and prioritize their maintenance process.

In an embodiment, relatively stable dependencies among asset components can be computed from textual documents such as technical manuals, and the components' installation locations. Relatively less updated frequency of data such as reports of monthly/quarterly maintenance of asset components also can be used. These dependencies among components can be represented in forms of graphs or ontologies and they can be used to regularize a deep learning model that performs predicting future status of asset components. Assessing future status of an asset component can thus be a very complex non-linear function which is encoded and implemented through multi-layers of a deep learning model. The model may use the real-time interaction among asset components while they are under operation to accurately identify future status of asset components under monitoring.

In an embodiment, the graph and ontology used in the model may encode dependencies among asset components. Nodes in the graph and ontologies can be homogeneous, each representing an asset component and such graph of dependencies can be varied from time to time when the monitored system is being operated. Performance of each asset component along with the component's interaction can be monitored and analyzed timely to anticipate the component's future behaviors, supporting the process of prioritizing asset component's repair and replacement processes.

In an embodiment, an AI model can forecast different future health states of asset components, for example, to prioritize maintenance. The data being analyzed can come from different sources, under different formats and can be in both textual and numeric samples. The data can also be generated at different frequencies, ranging from being static, low-frequency to high-frequency. The data may be subject to different analytic treatments to maximally exploit their underlying information toward accurately forecasting future health of each asset component involved in the operating system.

In an embodiment, the system and model may base solution from deep learning with multiple network layers to analyze multiple data sources (asset components, weather data, etc.) regularized by the ontology and graph learnt from static and low-frequent updated documents. The model may forecast health status of asset components, which can include multiple states. The model can handle different data types, including both discrete text and continuous numbers, in a single model and data which may have been generated at different level of frequencies.

Figure 6:
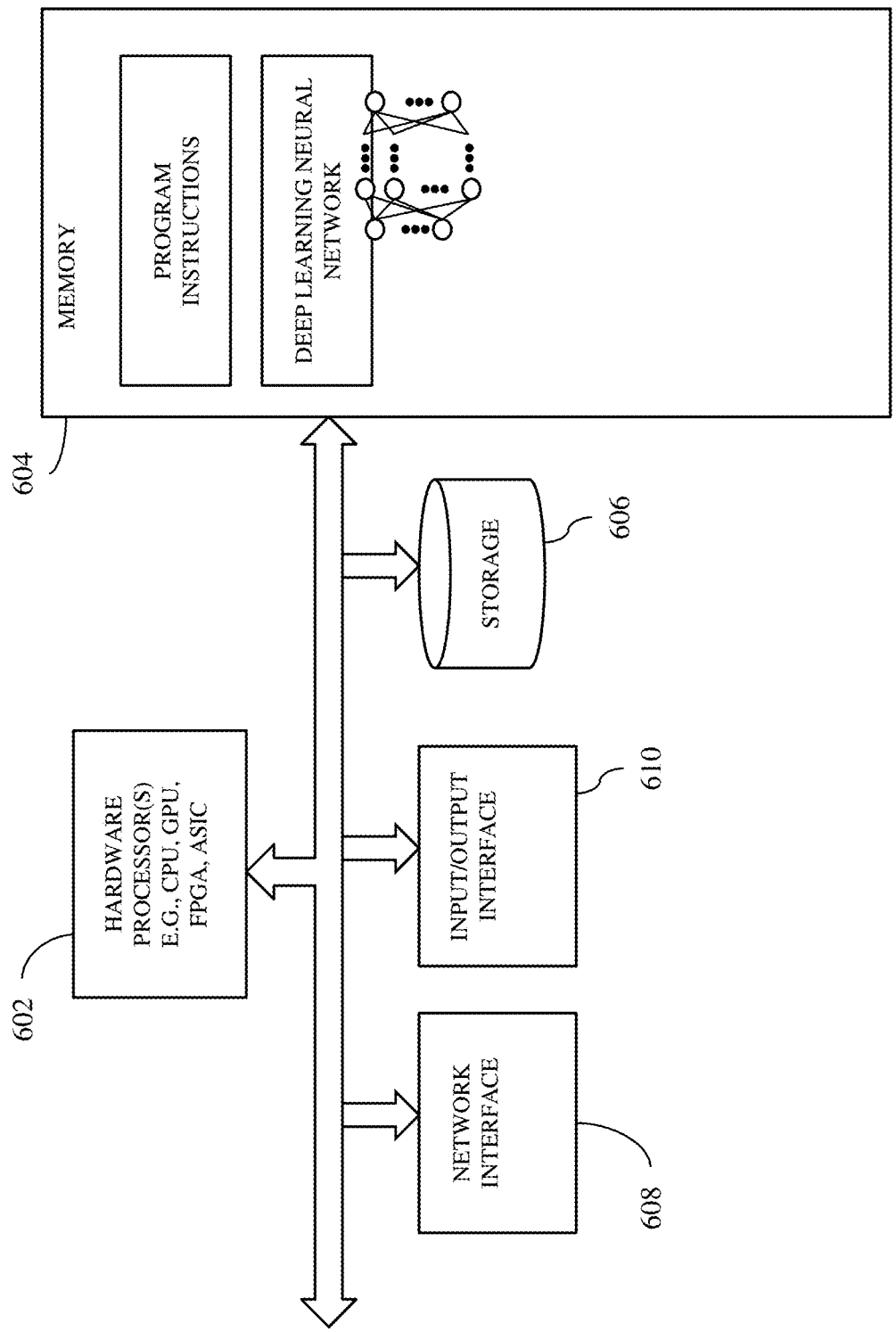
FIG. 6 is a diagram showing components of a system in one embodiment that can perform asset health prediction and discovery of asset dynamic impact.

FIG. 6 is a diagram showing components of a system in one embodiment that can perform asset health prediction and discovery of asset dynamic impact. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model for predicting future asset health and discovering dynamic impact of assets on one another. Such prediction and/or discovery can be used to prioritize and/or actuate maintenance and/or repair. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data.

One or more hardware processors 602 may receive a first set of data associated with assets. One or more hardware processors 602 may construct an ontology graph based on the first set of data. The ontology graph can include nodes and edges connecting at least some of the nodes, where a node of the ontology graph represents an asset of the assets, and where an edge connecting two nodes represents a relationship between the two nodes. One or more hardware processors 602 may receive a second set of data associated with the assets, the second set of data having a first frequency of sampling. Based on the second set of data, one or more hardware processors 602 may characterize the nodes of the ontology graph representing the assets. One or more hardware processors 602 may receive a third set of data associated with the assets, the third set of data having a second frequency of sampling, where the third set of data can include real time data sampled by sensors associated with the assets. Based on the third set of data and information associated with the assets represented by the ontology graph, one or more hardware processors 602 may train a deep learning neural network to predict a future state of at least one asset of the assets and discover dynamic mutual impact of the assets. In an embodiment, the first frequency of sampling can have lower frequency than the second frequency of sampling.

In an embodiment, received input data may be stored in a storage device 606 or received via a network interface 608 from a remote device, and may be temporarily loaded into a memory device 604 for building or generating the prediction model. The learned prediction model may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
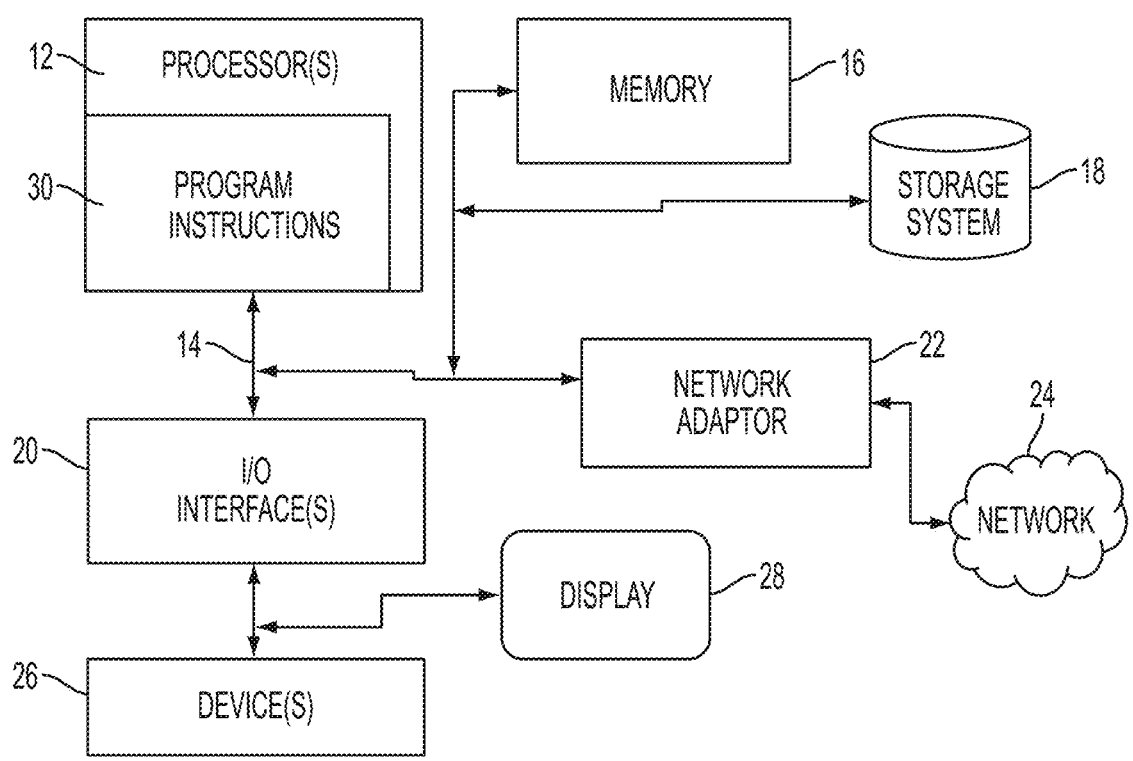
FIG. 7 illustrates a schematic of an example computer or processing system that may implement a system in one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
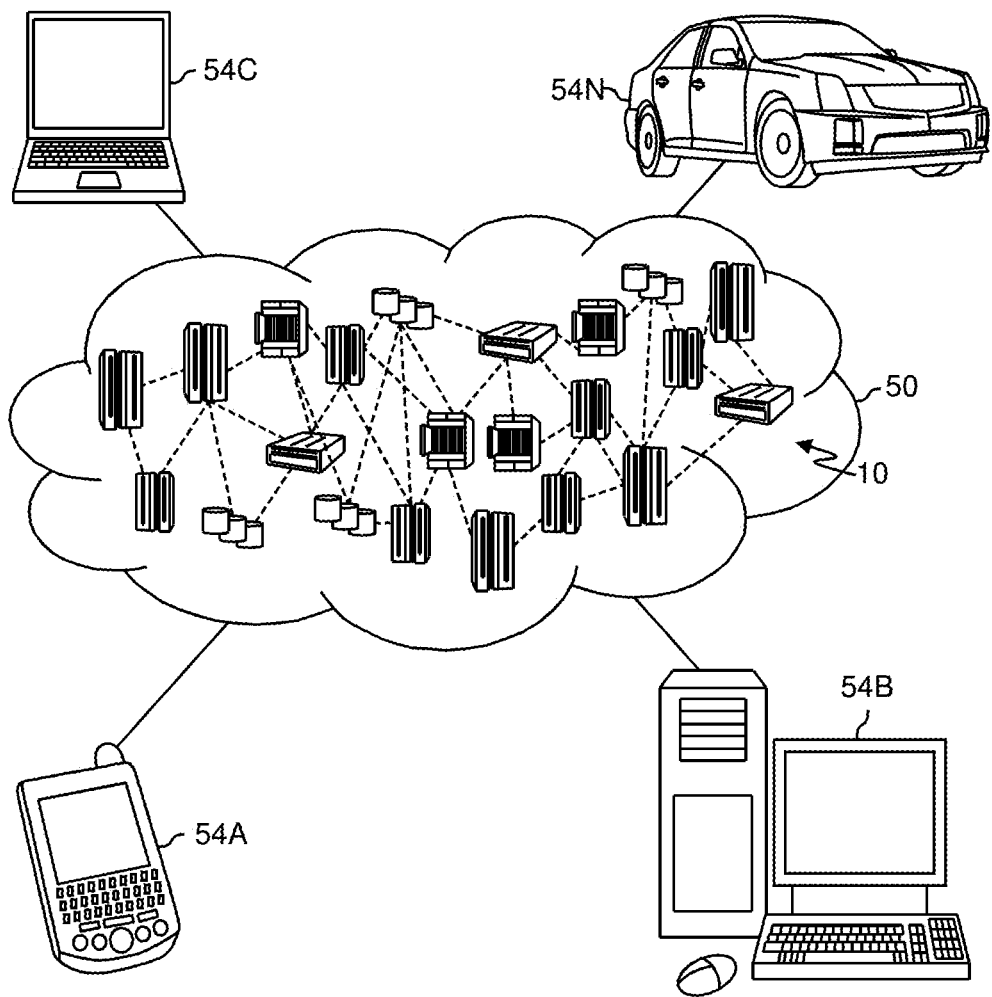
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
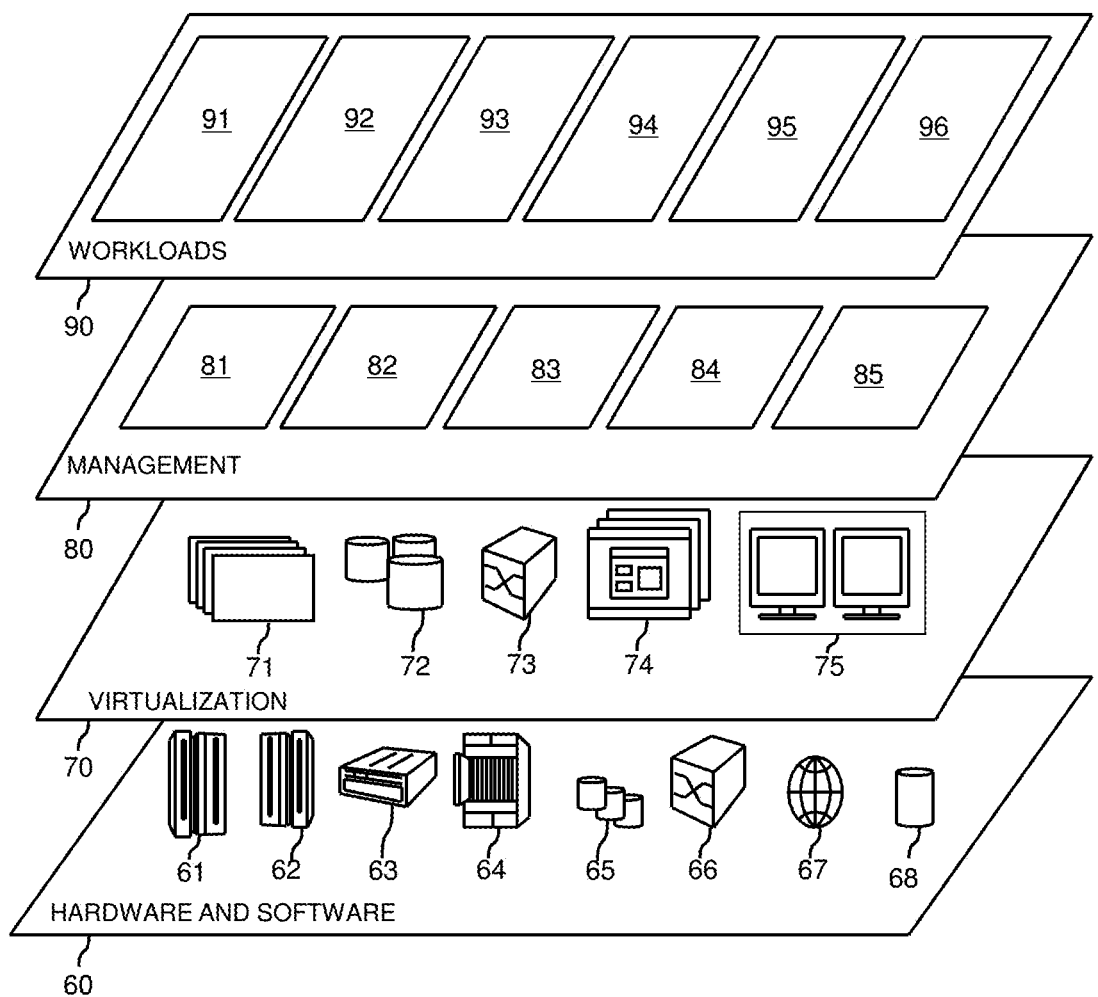
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asset health prediction and component impact discovery processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a processor;
    a memory device coupled with the processor;
    the processor configured to at least:
        receive a first set of data associated with assets, the assets including machine components and the first set of data including static data from sources that include at least technical manuals and assets' installation location;
        construct an ontology graph based on the first set of data, the ontology graph including nodes and edges connecting at least some of the nodes, wherein a node of the ontology graph represents an asset of the assets, and wherein an edge connecting two nodes represents a relationship between two of the assets represented by the two nodes;
        receive a second set of data associated with the assets, the second set of data having a first frequency of sampling, the second set of data including periodic maintenance data;
        based on the second set of data, characterize the nodes of the ontology graph representing the assets, the characterizing encoding different modes of interaction and dependencies among the machine components represented by the nodes;
        receive a third set of data associated with the assets, the third set of data having a second frequency of sampling that has higher frequency of occurrence than the first frequency, wherein the third set of data includes real time data sampled by sensors associated with the assets; and based on the third set of data and information associated with the assets represented by the ontology graph, train a deep learning neural network to both predict a future state of at least one asset of the assets and generate a dynamic dependency graph that discovers dynamic mutual impact of the assets at a same run, wherein the deep learning neural network receives multiple input channels, each of the multiple input channels representing the real time data sampled by a sensor associated with an asset of the assets, wherein a sliding time window of the real time data is received for training.

2. The system of claim 1, wherein the information associated with the assets represented by the ontology graph is represented as a data structure including an adjacency matrix.

3. The system of claim 1, wherein the deep learning neural network includes a self-attention encoder-decoder.

4. The system of claim 1, wherein the deep learning neural network takes as input multiple time series data generated from the assets.

5. The system of claim 1, wherein the information associated with the assets represented by the ontology graph is used to regularize a learning process of the deep learning neural network.

6. The system of claim 1, wherein the future state is used to prioritize maintenance of the assets.

7. The system of claim 1, wherein the deep learning neural network is retrained based on receiving updates to the second set of data.

8. The system of claim 1, wherein the assets include machinery equipment.

9. A computer-implemented method comprising:
receiving a first set of data associated with assets, the assets including machine components and the first set of data including static data from sources that include at least technical manuals and assets' installation location;

constructing ontology graph based on the first set of data, the ontology graph including nodes and edges connecting at least some of the nodes, wherein a node of the ontology graph represents an asset of the assets, and wherein an edge connecting two nodes of the ontology graph represents a relationship between two of the assets represented by the two nodes;

receiving a second set of data associated with the assets, the second set of data having a first frequency of sampling, the second set of data including periodic maintenance data;

based on the second set of data, characterizing the nodes of the ontology graph representing the assets, the characterizing encoding different modes of interaction and dependencies among the machine components represented by the nodes;

receiving a third set of data associated with the assets, the third set of data having a second frequency of sampling that has higher frequency of occurrence than the first frequency, wherein the third set of data includes real time data sampled by sensors associated with the assets; and based on the third set of data and information associated with the assets represented by the ontology graph, training a deep learning neural network to both predict a future state of at least one asset of the assets and generate a dynamic dependency graph that discovers dynamic mutual impact of the assets at a same run, wherein the deep learning neural network receives multiple input channels, each of the multiple input channels representing the real time data sampled by a sensor associated with an asset of the assets, wherein a sliding time window of the real time data is received for training.

10. The computer-implemented method of claim 9, wherein the information associated with the assets represented by the ontology graph is represented as a data structure including an adjacency matrix.

11. The computer-implemented method of claim 9, wherein the deep learning neural network includes self-attention encoder-decoder.

12. The computer-implemented method of claim 9, wherein the deep learning neural network takes as input multiple time series data generated from the assets.

13. The computer-implemented method of claim 9, wherein the information associated with the assets represented by the ontology graph is used to regularize a learning process of the deep learning neural network.

14. The computer-implemented method of claim 9, wherein the future state is used to prioritize maintenance of the assets.

15. The computer-implemented method of claim 9, wherein the deep learning neural network is retrained based on receiving updates to the second set of data.

16. The computer-implemented method of claim 9, wherein the assets include machinery equipment.

17. A computer program product comprising a computer readable storage medium having program instructions embodied therewith, the program instructions readable by a device to cause the device to:
receive a first set of data associated with assets, the assets including machine components and the first set of data including static data from sources that include at least technical manuals and assets' installation location;

construct an ontology graph based on the first set of data, the ontology graph including nodes and edges connecting at least some of the nodes, wherein a node of the ontology graph represents an asset of the assets, and wherein an edge connecting two nodes represents a relationship between two of the assets represented by two nodes;

receive a second set of data associated with the assets, the second set of data having a first frequency of sampling, the second set of data including periodic maintenance data;

based on the second set of data, characterize the nodes of the ontology graph representing the assets, the characterizing encoding different modes of interaction and dependencies among the machine components represented by the nodes;

receive a third set of data associated with the assets, the third set of data having a second frequency of sampling that has higher frequency of occurrence than the first frequency, wherein the third set of data includes real time data sampled by sensors associated with the assets; and based on the third set of data and information associated with the assets represented by the ontology graph, train a deep learning neural network to both predict a future state of at least one asset of the assets and generate a dynamic dependency graph that discovers dynamic mutual impact of the assets at a same run,
wherein the deep learning neural network receives multiple input channels, each of the multiple input channels representing the real time data sampled by a sensor associated with an asset of the assets, wherein a sliding time window of the real time data is received for training.

18. The computer program product of claim 17, wherein the information associated with the assets represented by the ontology graph is used to regularize a learning process of the deep learning neural network.

\* \* \* \* \*